Nov. 29, 1932.  A. T. SHEPHERD ET AL  1,889,156
APPARATUS FOR RECOVERING HEAT FROM WASTE WATER
Filed March 28, 1930
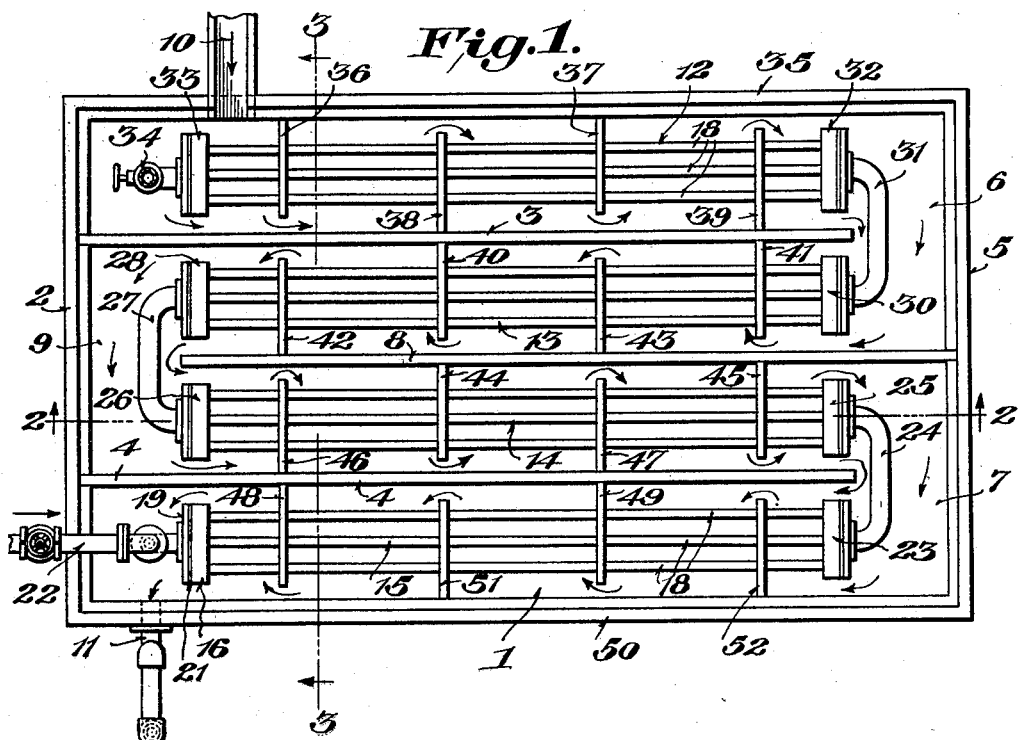
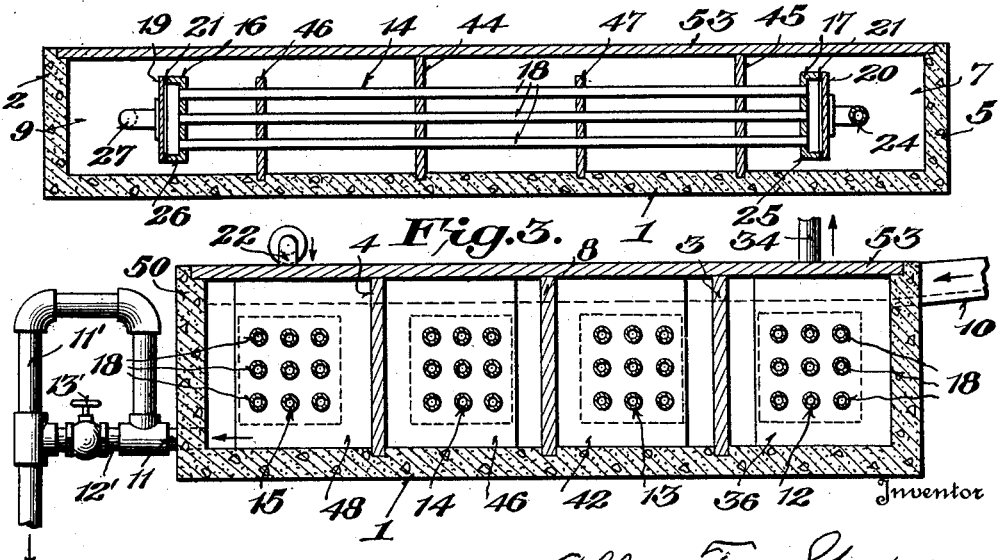

Patented Nov. 29, 1932

1,889,156

UNITED STATES PATENT OFFICE

ALLAN T. SHEPHERD AND DAVID E. SERGEANT, OF RICHMOND, VIRGINIA

APPARATUS FOR RECOVERING HEAT FROM WASTE WATER

Application filed March 28, 1930. Serial No. 439,691.

Our invention relates to improvements in apparatus for recovering heat from waste water.

Our invention pertains more particularly to utilizing the waste hot water from laundries for heating the supply of cold water used in the laundry, whereby the greatest amount of heat can be obtained from the waste water for heating the fresh water.

One object of our invention is to provide an apparatus of this character in which the waste water is caused to circulate back and forth between the tubes containing the fresh water and at the same time providing means whereby the tubes can be readily cleaned of the deposit of grease and lint or other waste matter which is found in waste water from laundries.

Another object of our invention is to provide an apparatus of this character in which the fresh water enters the tubes at a point where the waste water is the coolest and gradually travels through the tubes through a body of waste water gradually increasing in heat until it is discharged at a point where the waste water is at the highest temperature.

Another object of our invention is to provide an apparatus of this character in which the cold fresh water will have a longer passage through tubes in a tank of given size and thus effects greater utilization of the heat units in a given amount of waste water.

A further object of our invention is to provide an apparatus of this character in which access may be readily had to all of the tubes or pipes so that any of the tubes can be readily removed or replaced without removing all of the tube banks from the tank and said arrangement being such that all of the tubes can be more readily cleaned at any time without removing them from the tank.

A still further object of our invention is to provide a simple cheap and effective apparatus of this character having certain details of structure and combination of parts hereinafter more fully set forth.

In the accompanying drawing:—

Figure 1 is a top plan view of our improved apparatus with the cover removed.

Figure 2 is a vertical transverse sectional view taken on the line 2—2 of Figure 1.

Figure 3 is a longitudinal sectional view taken on the line 3—3 of Figure 1 showing the cover in place.

Applicants are aware that they are not the first inventers to utilize waste water of laundries for heating the supply of fresh water, as there are numerous patents showing this broad idea, but by their arrangement of tubes and partitions and baffle plates they have produced an apparatus in which the fresh cold water will absorb the greatest possible amount of heat from a given amount of waste water and absolutely preventing a cold body of water from remaining around the tubes.

Referring now to the drawing:—

1 represents the tank which as shown is preferably of a rectangular form and comparatively shallow. The end wall 2 of the tank is provided with the two vertically disposed partitions 3 and 4 which terminate at a distance from the end wall 5 leaving the spaces 6 and 7 to allow the flow of water around the partitions. The end wall 5 is provided with a partition 8 which is midway between the partitions 3 and 4 and terminates at a distance from the end wall 2 of the tank leaving the space 9 to allow the passage of water around the same. By this arrangement of the partitions it will be noted that applicants have provided a tank with four compartments having their opposite ends communicating with adjacent compartments whereby a long continuous passage is provided for the flow of the hot waste water from a point of reception indicated at 10 to the discharge 11, arranged in the side wall 50 of the tank. This discharge 11 extends upwardly to a point near the top of the tank and is then turned downwardly as indicated at 11' and which is connected to the sewer whereby a water lever is maintained in the tank. A pipe 12' provided with a valve 13' connects pipes 11 and 11' whereby the tank can be emptied at any time. Arranged in each of the four compartments are separate heating units 12, 13, 14 and 15, formed of banks of tubes. These heating units are constructed exactly alike and we will therefore describe one unit in detail.

The units comprise two heads 16 and 17 which are connected by tubes 18 which communicate with the heads and said tubes are arranged in series in vertical and horizontal alinement so that one tube is directly below or on the level with the other tubes to allow for the insertions of a brush or other cleaning means for washing the grease and lint or other waste matter from the tubes. The heads 16 and 17 are closed by the plates 19 and 20 having gaskets 21 to form a tight joint to prevent the leakage of the cold water from the heads or entrance of the dirty water from the tank into the heads. These heating units are of a height less than the depth of the tank so that the tubes and the heads are entirely submerged within the waste water of the tank. The heating unit 15 has a supply pipe 22 which is connected to the head thereof whereby fresh cold water is supplied to the heating unit. Connected to the head 23 of the heating unit 15 is a pipe connection 24 which extends around the partition 4 and is connected to the head 25 carried by the heating unit 14.

Connected to the head 26 of the heating unit 14 is a pipe 27 which is connected to the head 28 of the heating unit 13 and said pipe extending around partition 8. Connected to the head 30 of the heating unit 13 is a pipe 31 which extends around the partition 3 and connected to the head 32 of the heating unit 12. Connected to the head 33 of the heating unit 12 is a discharge or outlet pipe 34 leading to the storage tank or to the desired place of use. The side wall 35 of the tank is provided with inwardly extending baffle plates 36 and 37 through which the heating tubes pass. The partition 3 is provided with two baffle plates 38 and 39 staggered in relation to the baffle plates 36 and 37 and whereby it will be seen that the waste water takes a zigzag course. The partition 3 has the two baffle plates 40 and 41 through which the tubes of the heating unit 13 pass. The partition 8 has the baffle plates 42 and 43 arranged in staggered relation to the baffle plates 40 and 41. The partition 8 has the baffle plates 44 and 45 through which passes the tubes of the heating unit 14 and the partition 4 has the baffle plates 46 and 47 arranged in staggered relation to the baffle plates 44 and 45. The partition 4 is provided with the baffle plates 48 and 49 through which the tubes of the heating unit 15 pass and the wall 50 of the tank is provided with baffle plates 51 and 52 arranged in staggered relation to the baffle plates 48 and 49.

The tank is closed by a cover 53 and so arranged to form a tight joint with the tank so that the vapors and steam from the hot waste water will be retained in the tank to be utilized in heating the cold fresh water.

From the foregoing description, it will be seen that we have produced an apparatus of this character in which the dirty waste water takes a zigzag course from the point of entrance to the point of discharge and passes continuously between the tubes of the heating units so that all of the heat of the water will be transmitted to the cold fresh water in the tubes. It will also be noted that the flow of the dirty waste water is in an opposite direction from the fresh cold water so that the cold water enters the head 18 at a point where the waste water is the coldest and gradually finds its way to the end of the heating unit 12 where the waste water is the hottest. Therefore the fresh water is discharged at the point where the waste water is the hottest and thus is heated to the greatest possible extent by the waste water.

While we have shown four heating units in the tank, it will be understood that the same may be increased or decreased without departing from our invention. The number of heating units used will be governed by the quantity of water desired to be heated.

Having thus fully described our invention, what we claim is:—

An apparatus of the character described comprising a comparatively shallow tank having a water inlet adjacent one side and an outlet adjacent the opposite side, partitions carried by the ends of the tank and forming a zigzag passage for the water in the tank, heaters arranged in the tank and between the partitions and the sides of the tank, said heaters composed of heads connected by tubes, pipes connecting the heads around the ends of the partitions, baffles carried by the tubes and adapted to cause the zigzag passage of the water across the tubes and a water supply for the heaters adjacent the discharge of the tank and an outlet for the heater adjacent the hot water supply for the tank whereby the flow of water through the heater is in opposite direction to the flow of hot water in the tank.

In testimony whereof we affix our signatures.

ALLAN T. SHEPHERD.
DAVID E. SERGEANT.